United States Patent [19]

Nagata

[11] 4,382,256

[45] May 3, 1983

[54] PAGING RECEIVER WITH DISPLAY

[75] Inventor: Koichi Nagata, Tokyo, Japan

[73] Assignee: Nippon Electric Co., Ltd., Tokyo, Japan

[21] Appl. No.: 201,990

[22] Filed: Oct. 29, 1980

[30] Foreign Application Priority Data

Nov. 1, 1979 [JP] Japan ................................ 54-140442

[51] Int. Cl.[3] .......................... G08B 5/22; H04Q 1/30

[52] U.S. Cl. .......................... 340/825.44; 340/825.48; 340/311.1

[58] Field of Search ...................... 340/825.44, 825.47, 340/825.48, 825.36, 825.37, 311.1; 455/31-38

[56] References Cited

U.S. PATENT DOCUMENTS

| | | | |
|---|---|---|---|
| 3,846,783 | 11/1974 | Aspell et al. | 340/825.44 |
| 3,944,724 | 3/1976 | Kilby et al. | 340/825.44 |
| 3,984,775 | 10/1976 | Cariel et al. | 340/825.44 |
| 4,160,240 | 7/1979 | Partipilo | 340/825.44 |
| 4,249,165 | 2/1981 | Mori | 340/825.44 |
| 4,263,480 | 4/1981 | Levine | 340/825.44 |

*Primary Examiner*—Donnie L. Crosland

*Attorney, Agent, or Firm*—Laff, Whitesel, Conte & Saret

[57] ABSTRACT

A paging receiver demodulates a carrier wave modulated with a paging signal code and a plurality of information key codes, respectively. The demodulated information key codes are decoded by a receiver when its own paging signal code is detected. The receiver contains a plurality of words corresponding to said information key codes, respectively. These stored words are read out when they correspond to the decoded information. The read-out codes are then displayed.

10 Claims, 20 Drawing Figures

| | |
|---|---|
| C1 | 1 0 0 0, 1 1 1 1, 1 0 1 0, 1 1 1 |
| C2 | 1 1 0 0, 1 0 0 0, 0 1 1 1, 1 0 0 |
| C3 | 0 1 1 0, 0 1 0 0, 0 0 1 1, 1 1 0 |
| : | : |
| C15 | 0 0 1 1, 1 1 1 0, 1 0 1 1, 1 1 0 |
| C16 | 0 0 0 1, 1 1 1 1, 0 1 0 1, 1 1 1 |
| C17 | 1 0 0 0, 0 0 0 0, 0 0 0 0, 0 0 0 |
| C18 | 0 1 0 0, 0 0 0 0, 0 0 0 0, 0 0 0 |
| C19 | 0 0 1 0, 0 0 0 0, 0 0 0 0, 0 0 0 |
| : | : |
| C30 | 0 0 0 0, 0 0 0 0, 0 0 0 0, 0 1 0 |
| C31 | 0 0 0 0, 0 0 0 0, 0 0 0 0, 0 0 1 |

FIG. 11

PAGING RECEIVER WITH DISPLAY

The present invention relates to paging receivers with display function.

In such radio paging receivers of prior art, calling signals usually includes both a paging signal for identification of the called receiver and information signals such as speech messages. However, such receivers use speech messages and accordingly a round of calling signals takes from 15 to 20 seconds. They have a disadvantage of having to limit the number of subscribers per channel to around 1,500. Moreover, any such receiver involves a difference in bandwidth between its circuit for selecting a paging signal, such as a tone signal, and its voice amplifier for speech messages. Therefore such messages can hardly, if at all, reach a called person who is in a weak electric field zone even though the receiver detects, and draws his attention to, a paging signal. Furthermore, to obtain an audio output level which is high enough to override the noise level in the environment of its use, any such receiver requires a highly power audio amplifier for speech messages, resulting in a shorter battery life.

Meanwhile, some such receivers have a single-digit numeral display but they require the user to remember what he is supposed to do in response to the displayed numeral. He may sometimes be unable to remember it and therefore is unable to take the required action. Since the address is indicated in a single digit, moreover, the amount of information is too strictly limited for the receiver to handle complex informationn such as speech messages.

An object of the present invention, therefore, is to provide a battery saving, highly sensitive paging receiver with display, requiring little occupied calling time and yet capable of receiving diverse information.

According to the present invention, a paging receiver receives and demodulates a carrier wave modulated with a paging signal code, and a plurality of information key codes corresponding to a plurality of words, respectively. The demodulated information includes key codes which are decoded when a receiver detects its own paging signal code. A plurality of words corresponding to said information key codes are, respectively, prestored in the receiver. Words corresponding to the decoded information key codes are read out of the prestorage and displayed as read-out words.

Other advantages and features of the present invention will be more apparent from the detailed description hereunder taken in conjunction with the accompanying drawings, wherein FIG. 1 is a schematic diagram illustrating a base station for use in the invention;

FIG. 11 shows a parity check matrix;

Figure 1:
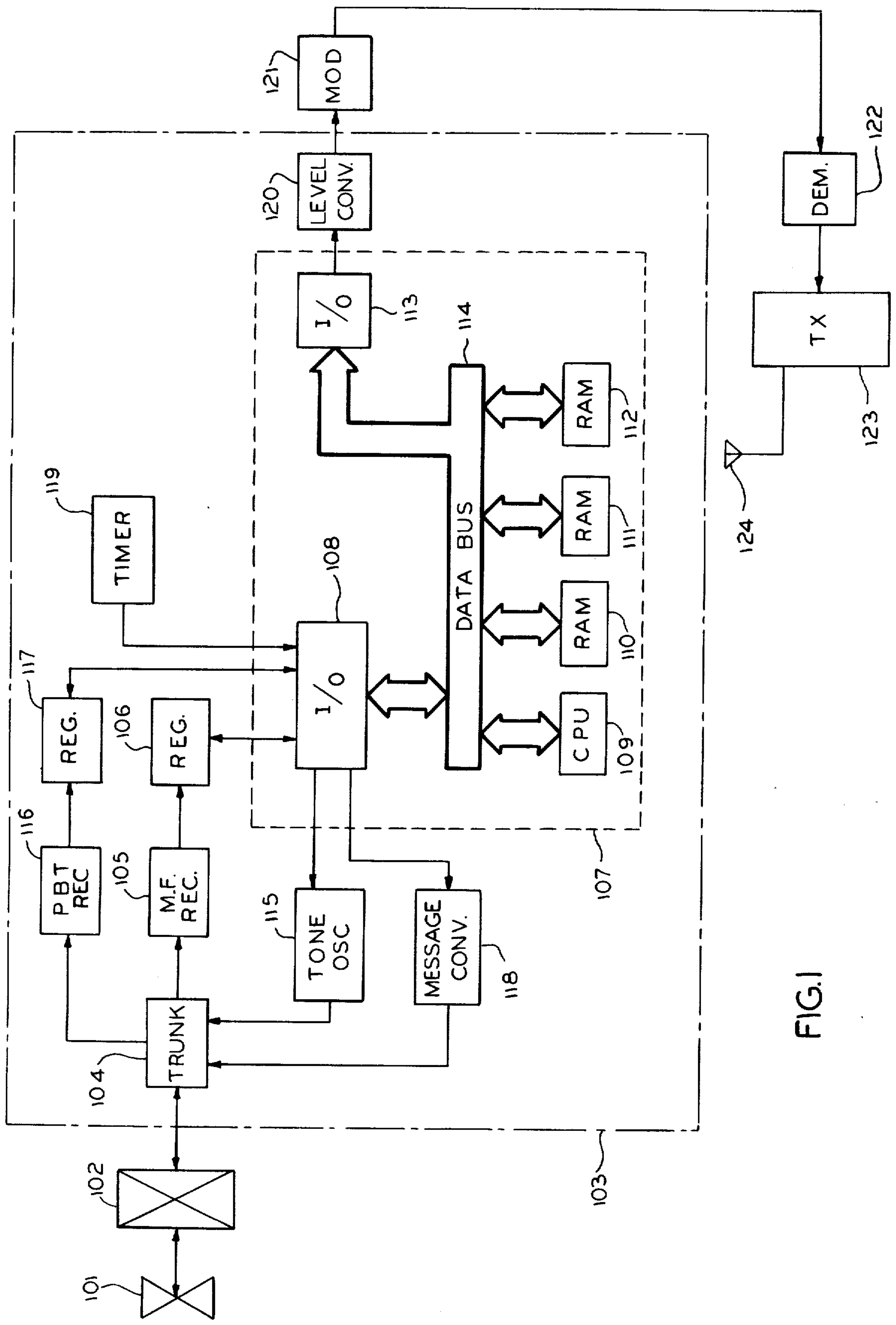

In the base station illustratedd in FIG. 1, the calling subscriber enters into his push-button telephone set 101 the address number of the paging receiver which is to be called. A common telephone exchange network 102 transfers this address number in the form of MF (multifrequency) signal to a paging terminal 103. An MF receiver 105 receives the transferred MF signal through a trunk 104, detects the address number, and supplies it to a register 106. The address number in the register 106 is checked, by way of an input/output (I/O port) 108 and a data bus 114 in a central controller 107. The check compares the received signal with a subscriber address number data file in a random access memory (RAM) 111. If the number is found registered therein, the I/O port 108 actuates a tone oscillator 115 and sends a valid tone to the push-button telephone set 101.

Upon receipt of this valid tone, the caller enters first an asterisk (*), then, after referring to an index, an appropriate key code number which will be explained in greater detail hereunder, and finally another asterisk. Thus, if the key code number is 020301010103, the entry will be *020301010103*.

A push-button tone receiver 116 in the paging terminal 103 receives the entered signal through the network 102 and the trunk 104, decodes it into a BCD signal and feeds it to a register 117. Upon detecting the second asterisk, register 117 drives a central processing unit (CPU, for example, 8080 market by Intel) 109 by way of the I/O port 108. The CPU 109 reads out a key code number stored in the register 117. The CPU reads out key code number data and message data for the caller's confirmation service, from data registered in a key code number data file and a word date file in the RAM 111, respectively. Also, the CPU 109 sends these read-out data to a message converter 118 through the I/O port 108. The message converter 118 converts these read-out data into a voice message and supplies the voice message to the push-button telephone set 101. The confirmation message may be, for instance, "Is your message so-and-so (words corresponding to 020301010103)? If it is, hang up after pushing the asterisk button."

After confirming his message, the caller pushes in an asterisk on his push-button telephone set 101. The asterisk is again entered into a register 117 through the trunk 104 and a push-button tone receiver 116. Upon detecting the third asterisk, the register 117 ceases to receive key code numbers, and gives a signal indicating this ceasation to the central controller 107 by way of the I/O port 108.

In response to this signal, the central controller 107 first enters a paging receiver address number in the register 106 via the I/O port 108, encodes it into a BCH (31, 16) code (this BCH code will hereinafter be referred to as the "subscriber code") and stores the code in a RAM 112. Then, a key code number is entered from the register 117 by way of the I/O port 108. Every four digits, from the most significant digit on, of the key code number are grouped into a unit. Thus in the aforementioned case of 020301010103, the first unit will be 0203; the second, 0101; and the third, 0103. These units are stored in the BCH code (31, 16) form as a signal code of three consecutive words (hereinafter referred to as "information code") at an address immediately following the aforementioned subscriber code in the RAM 112. In this manner, input signals from the caller are successively stored in the calling signal area of the RAM 112.

A timer 119 gives output timing signals to the I/O port 108 at one-minute intervals. Upon detecting this output timing signal, the central controller 107 reads out first a preamble code and synchronization code in a ROM 110. Then, it successively reads out the subscriber code stored and information code in the calling signal area of the RAM 112. After having read out the codes in the calling signal area of the RAM 112, it reads out an end code in the ROM 110, and supplies these codes, serially in the reading-out order, to a level converter circuit 120 by way of an I/O port 113. The level converter circuit 120 converts these signals to a level suitable for a data MODEM, and feeds them to a modulator 121, which sends them out on the line as FSK signals. The FSK signals are demodulated into baseband signals by a demodulator 122 in the transmitting base station and fed to a transmitter 123, which modulates a carrier wave with these baseband signals and sends them out through an antenna 124.

Figure 2A:
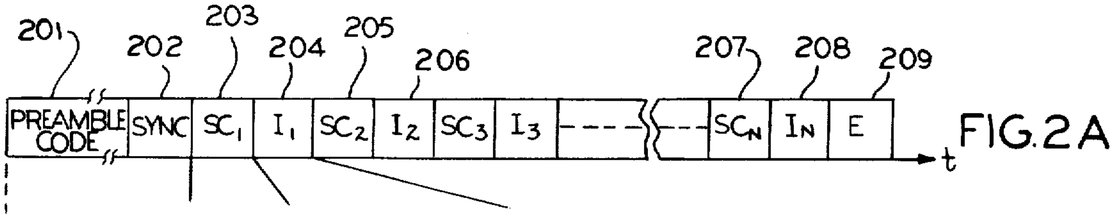
FIGS. 2A and 2B are diagrams showing the composition of a transmission signal.
Figure 2B:
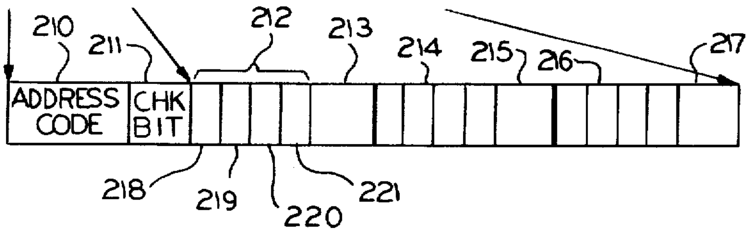

The signal code format for use in the present invention, as illustrated in FIG. 2A, includes a preamble code 201, word synchronization code 202, subscriber or paging codes 203, 205 and 207, information codes 204, 206 and 208, and an end code 209. The preamble code 201 is in a pattern "1010 . . . " for bit synchronization, and the word synchronization code 202 has a unique pattern for word synchronization. The subscriber code 203, as shown in FIG. 2B, is a single 31-bit word consisting of a 16-bit address code 210 and 15 check bits 211. In the information code 204, 206 or 208, consisting of three words, the key code numbers are assigned, for each unit, to words 212, 214 and 216 in that order, to which check bits 213, 215 and 217 are added respectively. Herein, the words 218, 219, 220 and 221 are key code numbers of the first unit, expressed in BCD code.

Figure 2C:
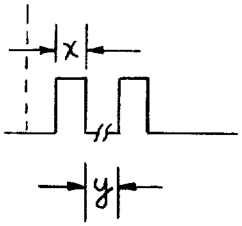
FIG. 2C is a timing chart of battery saving operation.
Figure 3:
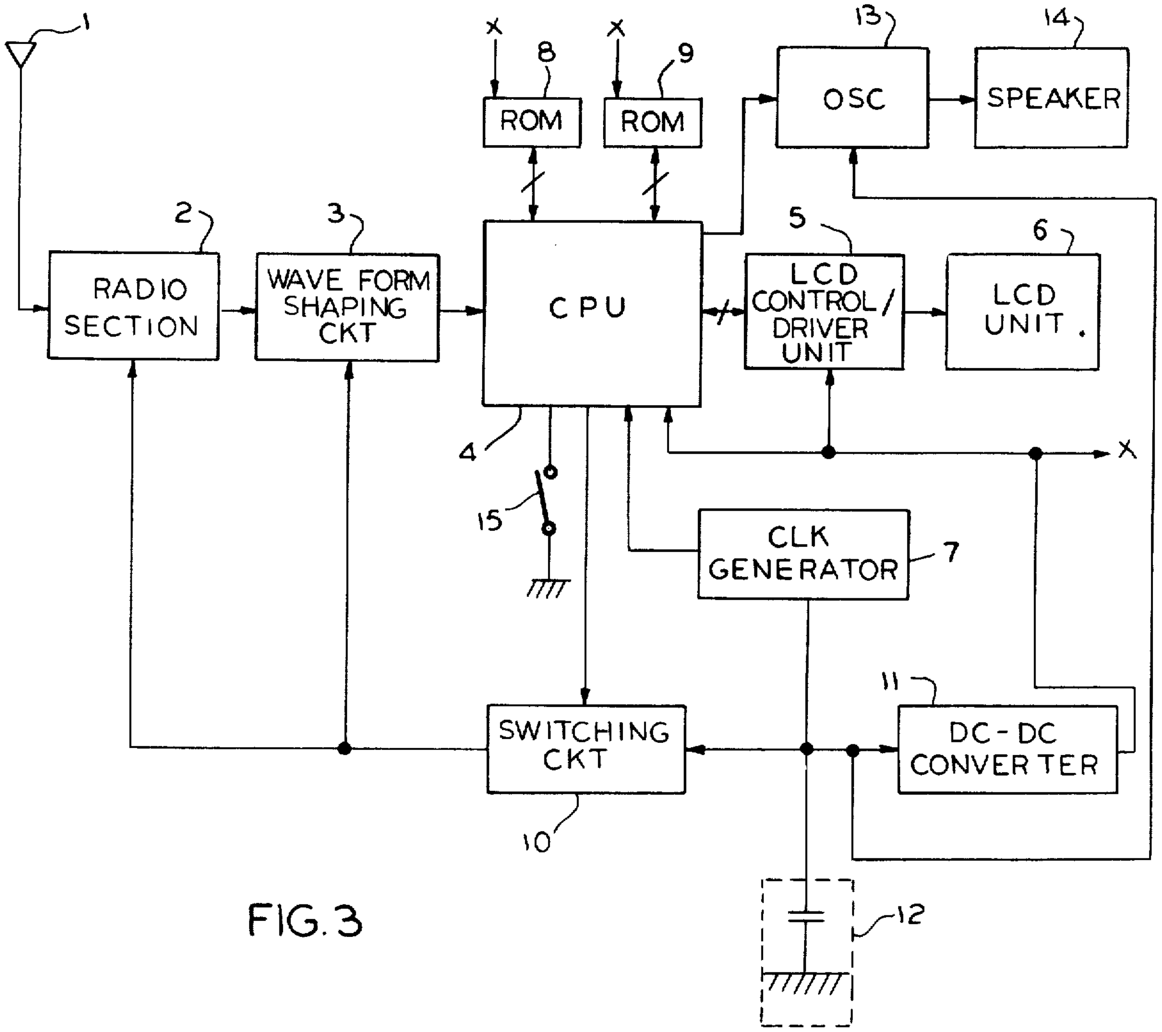
FIG. 3 is a schematic diagram illustrating a receiver for use in the invention.

FIG. 2C illustrates the cycle of the battery saving operation of the receiver of FIG. 3 for use in the present invention.

In the receiver illustrated in FIG. 3, a CPU 4 controls an electronic switching circuit 10 to supply power to a radio section 2 and to a waveform shaping circuit 3 for a fixed duration of the time period x, shown in FIG. 2C. During the time measured by signal x, the radio section 2, amplifies radio signals received through an antenna 1, and demodulates them into baseband signals. The demodulated signals are converted into rectangular signals by the waveform shaping circuit 3 and are entered into the CPU 4, which receives the input signals in synchronization with a read-in timing pulse in the manner described below, the CPU 4 monitors the emergence of the preamble code 201 (FIG. 2A). If no preamble signal is detected within the prescribed period of time, the CPU 4 controls the electronic switching circuit 10 to cut off the power supply to the radio section 2 and the waveform shaping circuit 3 for a fixed duration of the time y shown in FIG. 2C. This battery saving operation is repeated.

Secondly, when the preamble code 201 is detected, the CPU 4 discontinues its battery saving operation and shifts to detection of the word synchronization code 202 and the subscriber code of its own receiver. Upon detection of a subscriber code which is identical with a code written into a Programable Read-Only-Memory (PROM) 8, the CPU 4 feeds an alert actuating signal to an oscillator 13, and reads out of a PROM 9 the words which are stored at an address corresponding to a key code number designated by the following information code. Also, the words is expressed in an eight-bit ASCII code.

Thirdly, the CPU 4 temporarily stores in its internal RAM the ASCII code read out of the PROM 9, reads it out by operating a switch 15 and transfers it to a display control/drive unit 5, to which a display control signal is also given.

Fourthly, after detecting the preamble code 201, the CPU 4 resumes its battery saving operation upon detection of the end code 209. The display control/drive unit 5 internally processes the ASCII code entered (i.e. decodes it with a segment decoder and stores it in a data memory, whose output is connected to an LCD driver). In response to the display control signal from the CPU 4, the control/drive unit 5 drives each segment of an LCD unit 6 to perform its displaying function.

Meanwhile the oscillator 13, in response to the entered alert actuating signal, starts a low frequency oscillation and amplifies the level of this oscillation to drive a speaker 14, which converts the input signals into sounds. A clock oscillator 7 generates a source clock for the CPU 4 and control/drive unit 5. The output of a battery 12 is boosted in voltage by a DC-DC converter 11 and supplied to the circuits 4, 5, 8, 9 and 13.

Figure 4:
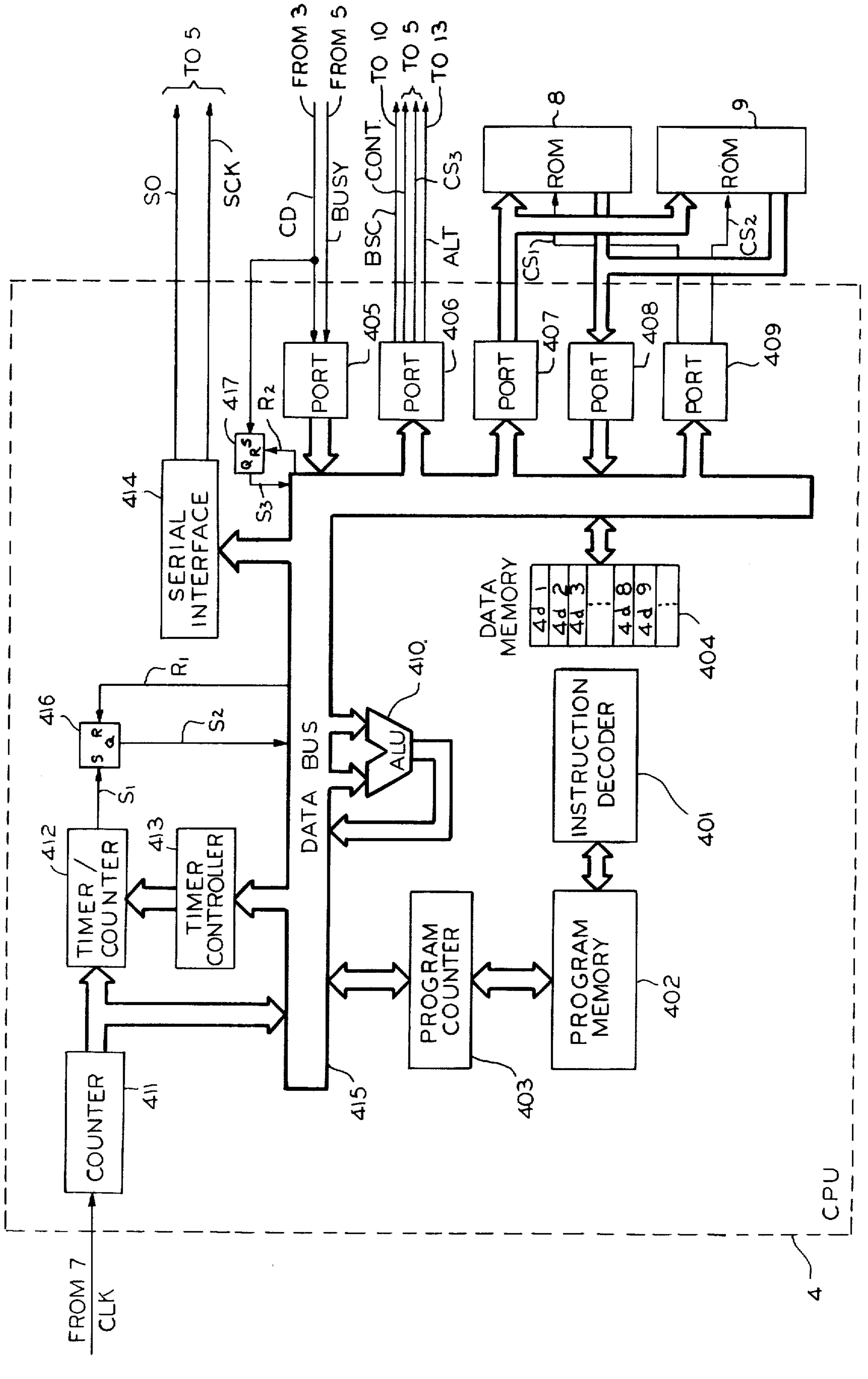
FIG. 4 shows a block diagram of the central processor unit.

In the CPU 4 of FIG. 4 (for instance a μPD 7502 unit manufactured by NEC), reference numeral 401 represents an instruction decoder, which is a central component for controlling each block for deciphering codes to be executed and executing the instructions thereby expressed. A Read-Only-Memory (ROM) 402 is a program memory in which are stored groups of instructions to be executed. Reference numeral 403 represents a program counter (PC) for addressing the programs written into the ROM 402. Normally, every time an instruction is executed, the count of the PC 403 is automatically incremented according to the number of bytes of the instruction, and is cleared by a jump instruction or a subroutine instruction.

Reference numeral 405 identifies an input port for entering rectangular signals CD from the waveform shaping circuit 3; 406, an output port for supplying the control signal BSC to the electronic switching circuit 10 and the alert actuating signal ALT to the oscillator 13; 407, an output port for supplying an addressing signal for reading out of the ROMs 8 and 9; 408, an input port for entering the addressed contents of the ROMs 8 and 9; 409, an output port for supplying a chip select signal CS1 to set the ROM 8 in action and another chip select signal CS2 to set the ROM 9 in action; 410, an arithmetic and logic unit (ALU) having functions of arithmetic and logic operations, judgement for operation results, and exchanging of data with memory I/O ports and registers; 411, a counter circuit; 412, a timer/-counter which is a comparator/equality unit; 413, a timer control circuit for setting the timer cycle; 414, a serial interface for supplying an output signal SO to transfer serial data to the display control/drive unit 5 and a synchronizing signal SCK to enable the LCD control/drive unit 5 to read serial data in; 415, an internal data bus by way of which data are transmitted and received between blocks; and 416 and 417, S-R type flipflops.

This CPU 4 functions in the following manner. The instruction decoder 401 performs various processes by reading in data stored in the program memory 402, as addressed by the program counter 403, and decoding the data so read. For instance, it reads in signals CD by way of the I/O port 405, and alters the data contents of the data memory 404 or the timer controller 413 by way of the data bus 415. The output signal (source clock signal) CLK of the oscillator 7 is connected to the clock input of the counter 411, which counts up in accordance with the input clock. The output of counter 411 is led to the timer/counter 412. The timer/counter 412 compares the output of the counter 411 and data set in the timer control 413 and, when it finds them identical, sends a detection signal $S_1$ to set a flipflop 416, whose output signal $S_2$ is applied to the internal data bus. The program counter 403 is set in response to the output signal S2. The predetermined routine instructions in the program memory 402 are executed. At the same time, the flipflop 416 is reset in response to the signal R1. Similarly, the flipflop 417 detects the leading edge of the rectangular signals or pulses CD from the circuit 3, thereby providing a signals $S_3$. Upon detection of the signals $S_2$ and $S_3$, reset signals $R_1$ and $R_2$ are supplied from the instruction decoder 401, and the flipflops 416 and 417 are thereby reset.

Next, the battery saving operation and receiving operation will be described in detail with reference to the flow charts of FIGS. 5 to 10.

First, at step 30, the CPU 4 starts its operation to receive radio signals by supplying power to the radio section 2 and waveform shaping circuit 3 by way of the electronic switching circuit 10 in response to the control signal BSC. Next, at step 31, a register 4d1 is cleared in the data memory 404. This register stores rectangular signals CD from the waveform shaping circuit 3. (The CPU 4 reads in rectangular signals CD bit by bit and stores the data read in on a bit-by-bit basis. Therefore, this data memory region stores required bits of the latest rectangular signals CD.) Then, at step 32, data corresponding to a time x, required for detecting the preamble, are set in a counter 4d2 of the data memory 404 to monitor the time x. Monitoring of this time x, as step 38 shows, is accomplished by subtracting 1 from the data in the x counter in the data memory 404 at fixed intervals and checking whether or not the data have become zero or smaller. At step 33, to synchronize a read-in timing pulse with the rectangular signals CD, reference data are set in the timer controller 413. These data can be obtained in a unitary manner to make the cycle of each received bit of the signal code strings coincide with the cycle of the read-in timing pulse.

Step 34, which is a pretreatment for monitoring the leading edges of rectangular signals CD at the following step 35, resets the flipflop 417 which is set by the leading edge of a rectangular signal CD. Step 34 also clears a register **4*d*3 in the memory 404** which is used for monitoring the leading edges of rectangular signals CD.

At step 35, as will be described in greater detail hereunder, the leading edge of a rectangular signal CD is detected by way of the flipflop 417. The output datum of the counter 411 is stored at that time (this datum is the length of time required for a rectangular signal CD to rise, as measured from a read-in timing pulse). Datum is stored in a part of the data memory 404 in order to register information needed for correcting the timer cycle at step 37. Completion of the timer operation, set at step 33, is monitored through the output $S_2$ of the flipflop 416. Upon completion of the timer operation, a rectangular signal CD is read in through the I/O port 405, and the datum is stored. The stored data is shifted by one bit, by way of the internal data bus 415, in a storage area **4*d*1 of the memory 404 which was initially cleared at step 31**.

At step 36, it is determined whether or not the content of the memory area **4*d*1 coincides with the preamble code 201 (the reference preamble code is registered in the program memory 402 in advance). If a coincidence is confirmed, the process moves on to step 44 and enters the reception flow from the word synchronization code 202 on. Conversely, if no coincidence is observed, the process goes on to step 37 to continue detection of the preamble code 201**.

At step 37, to correct any advance or delay of the read-in timing pulse in accordance with the information collected at step 35, a cycle adjustment for one bit is achieved by setting, in the timer controller 413, the data set at step 33 and is appropriately corrected. Further details will be given hereunder.

At step 38, "1" is subtracted from the x counter for determining the preamble code detection time set at step 32. Then at step 39, whether or not the x counter has finished counting is checked. If it has, the process moves on to step 42 to immediately cut off the power supply to the radio section 2 and waveform shaping circuit 3 by means of a control signal BSC. At step 43, the system stands by (in a battery saving operation) for a duration of a time period y. After the time y has elapsed, the process returns to step 30 to repeat the aforementioned preamble code detecting operation. On the other hand, at step 39, if the x counter has not yet finished counting, the process goes on to step 40, at which the output $S_2$ of the flip-flop 40 is monitored. If the output $S_2$ is "H (high level)", the process goes on to step 41, at which the signal CD is read in the register **4*d*1 through the I/O port 465 and the process goes on to step 33**.

Figure 5:
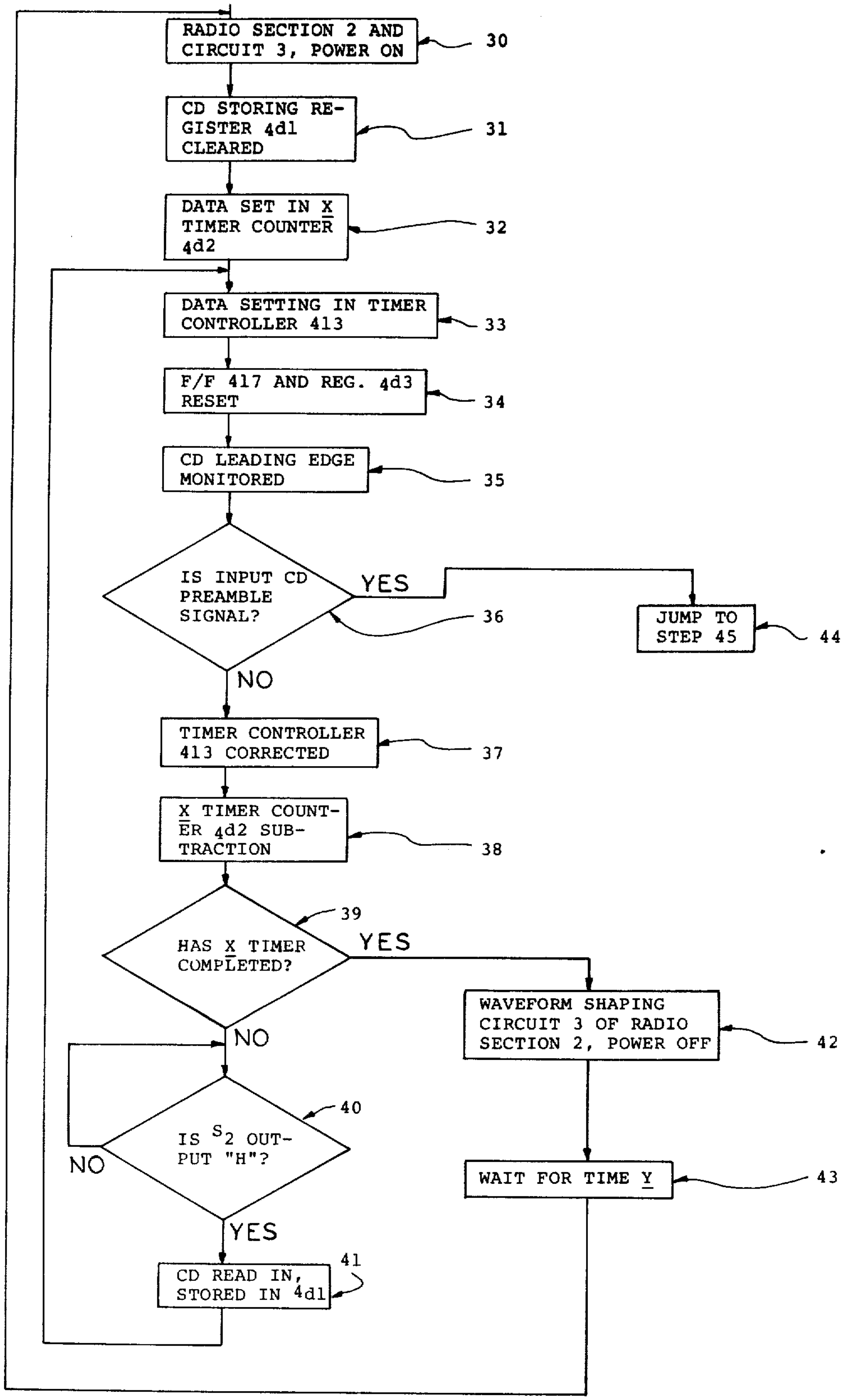
FIG. 5 is a flow chart showing a preamble code detecting procedure.

Next, the procedure required for bit synchronization, or step 35, and the "timer controller 413 correction" of step 37, both referred to in FIG. 5, will be described in further detail with reference to the flow charts of FIGS. 6 and 7.

Figure 6:
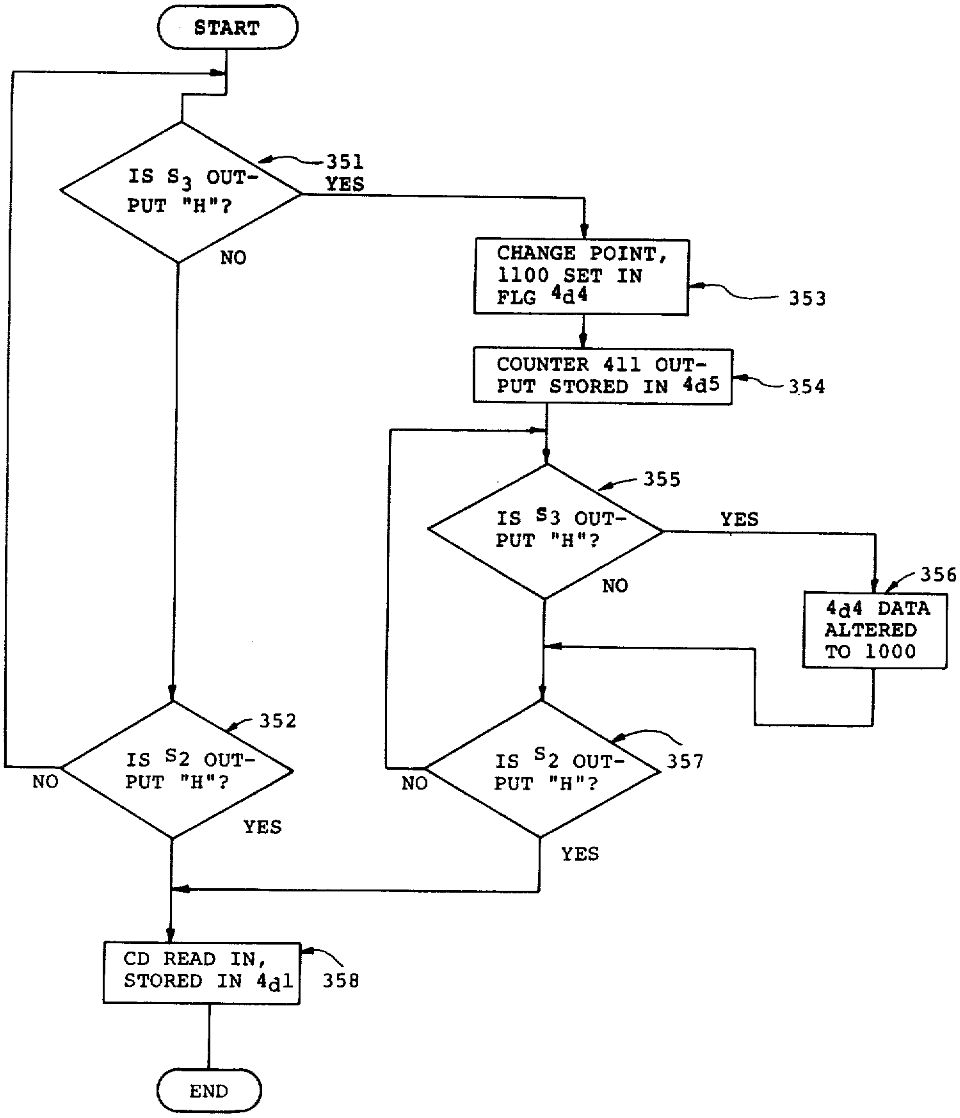
FIG. 6 is a flow chart showing a data leading edge monitoring procedure.

FIG. 6 is a flow chart for explaining the procedure for "monitoring of data leading edges". At step 351, the leading edge of a rectangular signal CD is monitored. The leading edge of a rectangular signal CD sets the flipflop 417, and signal $S_3$ gives an "H" output, which is monitored at step 351. If the signal $S_3$ output is not "H", the process moves on to step 352, and a judgement is made as to whether or not the signal $S_2$ output is high, i.e. whether or not the single-bit timer has completed operation. If the signal $S_2$ output is not high, the process jumps back to step 351, and the foregoing procedure is repeated until the single-bit timer completes its operation.

Meanwhile, if the signal $S_2$ output is judged to be "H" at step 352, the process goes on to step 358, at which (as at step 41) a rectangular signal CD is read in and stored in a rectangular signal storing register 4d1 to complete the procedure.

If the signal $S_3$ output is judged to be "H" at step 351, the process moves ahead to step 353, at which data "1100" are set in a flag storing register 4d4. Then at step 354, the output of the counter 411 is stored in a register 4d5, at this time, by way of the internal data bus 415. Next at step 355, signal $S_3$ is again checked to determine whether or not the signal $S_3$ output is "H". If the signal $S_3$ output is found to be "H", the process goes on the step 356, at which the data set in the flag storing register 4d4 at step 353 are turned into "1000" to make it known that two or more data leading edges have taken place in a bit, followed by a jump to step 357. If the signal $S_3$ output is not found to be "H", the process moves on to step 357 to judge whether or not the single-bit timer has completed its operation. If it has not, there is a return to step 355 or, if it has, the process jumps to step 358. This operation charted in FIG. 6 and enables the leading edge timing of input rectangular signals to be known from the data contents of the register 4d5 and from the number of leading edges of input rectangular signals in a single-bit cycle, to be known in the range of "0", "1" or "more than 1".

Figure 7:
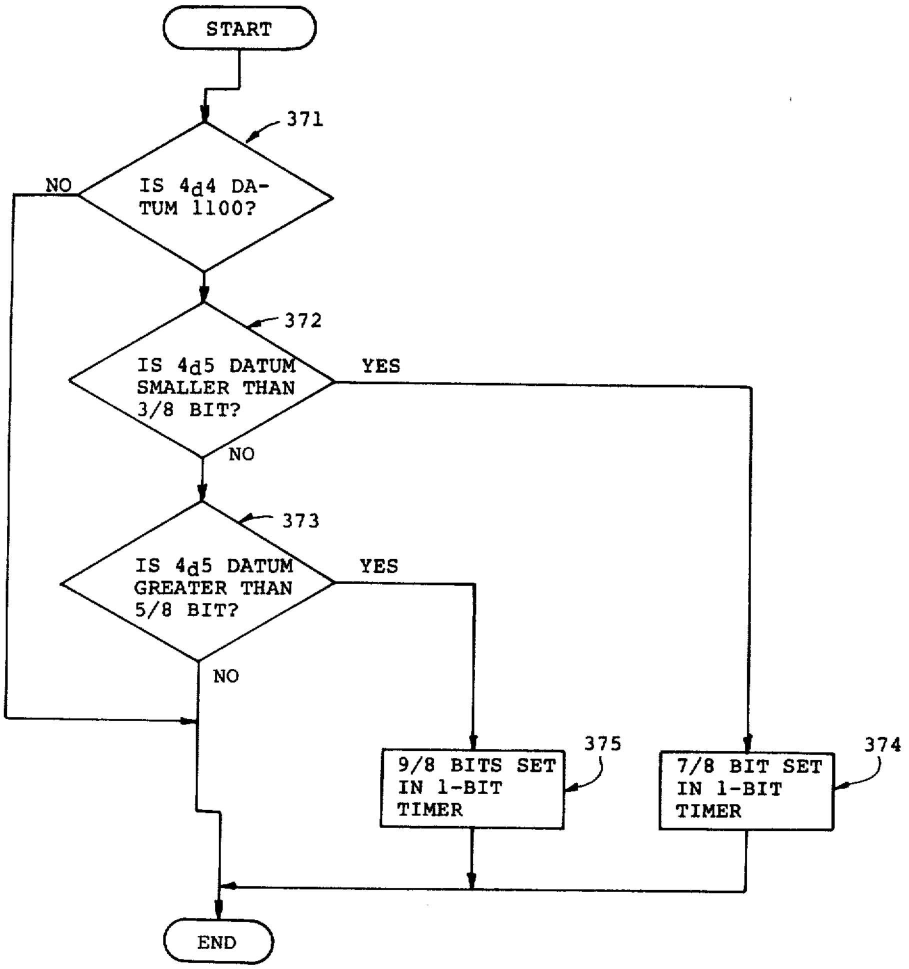
FIG. 7 is a flow chart showing the single bit correcting procedure.

FIG. 7 is a flow chart of the procedure for "correcting the single-bit timer" to adjust the phase of the read-in timing pulse on the basis of information obtained by the procedure for "monitoring of data leading edges" charted in FIG. 6. At step 371, the process judges whether or not the data contents of the flag register 4d4 are "1100", i.e. whether or not only one rectangular signal leading edge has taken place in the procedure for "monitoring of data leading edges". If the answer is "No", the timer controller 413 is not corrected and the procedure is completed here. In other words, the phase of the read-in timing pulse is kept as it is. Conversely, if the answer is "Yes", the process moves on to steps 372 and 373 to judge, with reference to the rectangular signal leading edge timing data in the register 4d5, whether the read-in timing pulse is in or out of phase and, if out of phase, whether the out-of-phase is forward or backward. If it is found to be out-of-phase in a forward direction, the phase of the read-in timing pulse is delayed by 1/8 bit at step 373, by setting data corresponding to 9/8 bits in the timer control circuit 413. On the contrary, if it is found to be out-of-phase in a backward direction, the phase of the read-in timing pulse is advanced by 1/8 bit at step 374 by setting data corresponding to 7/8 bit in the timer control circuit 413. If the pulse is found to be in phase, the timer control circuit 413 is not corrected and therefore the phase of the read-in timing pulse is kept as it is. The range in which the read-in timing pulse is judged to be synchronized is where the rectangular signal leading edge timing data in the register 4d5 correspond to anywhere between the 3/8 bit and 5/8 bit (the median being 4/8 bit).

Figure 8:
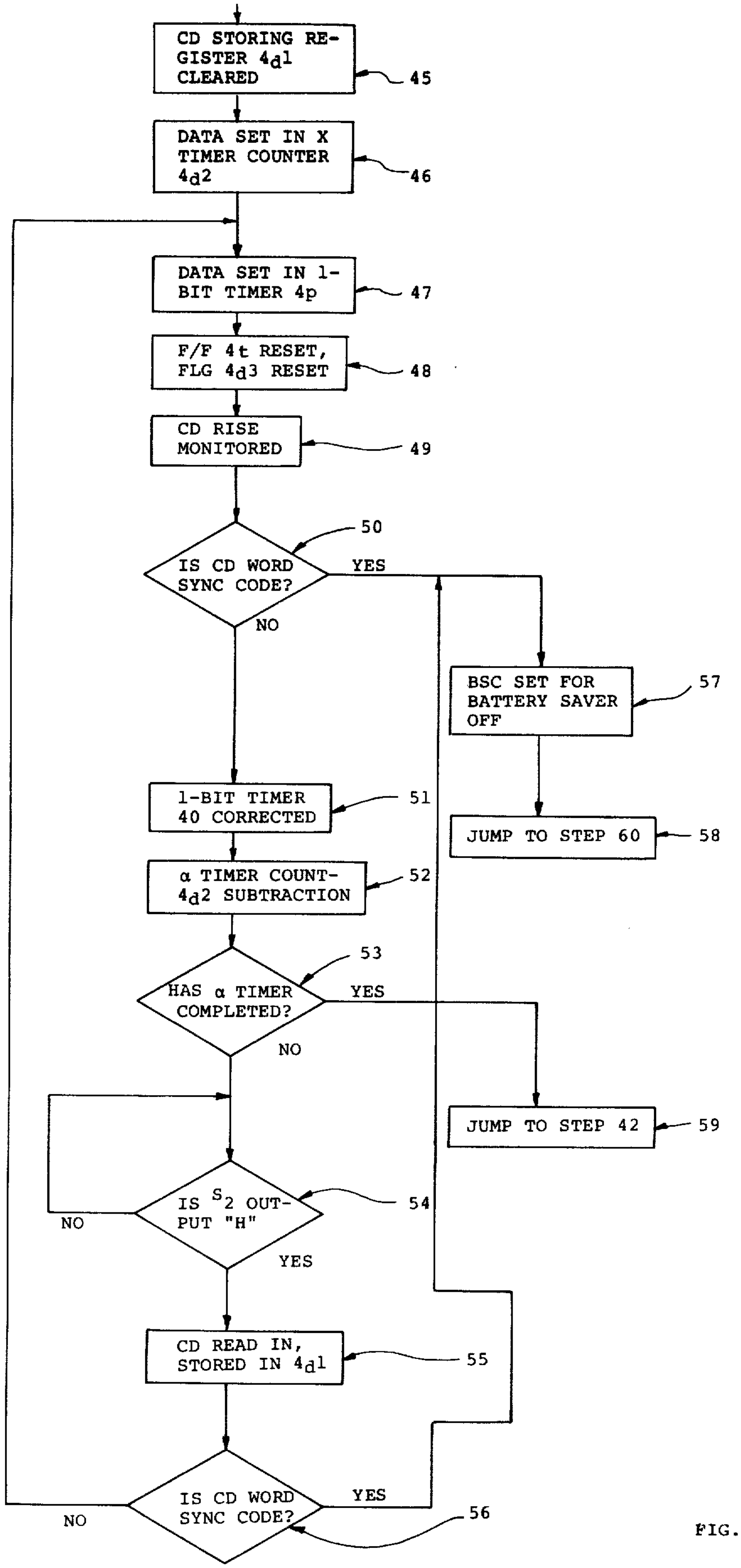
FIG. 8 is a flow chart showing a word synchronization code detecting procedure.

FIG. 8 is a flow chart for explaining the procedure for detection of the word synchronization code 202. This procedure is roughly similar to detection of the preamble code 201, charted in FIG. 5. The procedure in FIG. 8 differs from the procedure in FIG. 5 in that data corresponding to a word synchronization code 202 detecting time $\alpha$ are set at step 46 and that the word synchronization code 202 is detected at steps 50 and 56. All other steps from 47 to 55 respectively correspond to steps 33 to 41 of FIG. 5.

Detection of word synchronization by the two steps, 50 and 56, is to check rectangular signals CD, bit by bit, to determine whether or not any one of them is the word synchronization code 202. This determination amounts to a detection of the word synchronization code 202, which has a unique pattern differing from the I/O pattern of the preamble code 201. (The reference word synchronization code 202 is registered in the program memory 402 in advance.) Upon detection of the word synchronization code 202, the battery saver control signal BSC is set to "Battery Saver OFF" and latched at step 57. Next at step 58, the process jumps to make a detection of the subscriber code 203.

Figure 9:
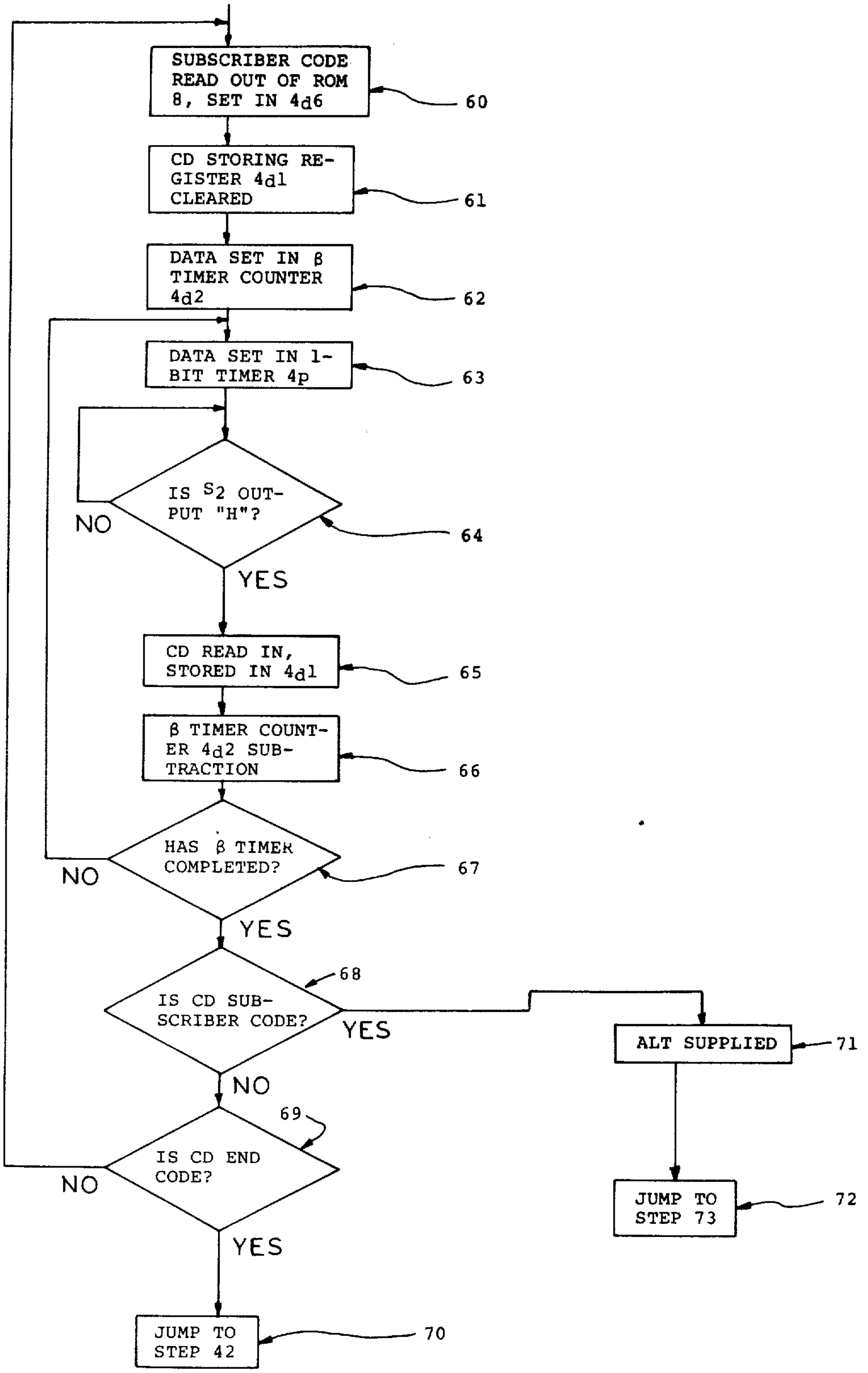
FIG. 9 is a flow chart showing a subscriber (or paging) code detecting procedure.

FIG. 9 is a flow chart for explaining the procedure for a detection of the subscriber code 203. At step 60, the chip selector control signal CS1 of the ROM 8 is made high (usually in a waiting state, both CS1 and CS2 are made low, and no contents of the ROM are read out). The subscriber code written at a predetermined address in the ROM 8 is read out and set in a register 4d6. Next at step 61, as at step 31, the storing register 4d1 is cleared, and at step 62 data for a time $\beta$ corresponding to 31 bits of the subscriber code 203 are set in the register 4d2.

At step 63, the data are set in the timer controller 413 to synchronize rectangular signals CD following the read-in timing pulse of the timer controller 413 corrected at step 51 immediately preceding the detection of the word synchronization code 202. At step 64 a single-bit time out is confirmed, and at step 65 the rectangular signal CD, at this time, is read in and stored in the register 4d1. Then at step 66, one bit is subtracted from the counter 4d2 set at step 62. At step 67 is confirmed a 31-bit time out. At step 68, the process determines whether or not the 31-bit rectangular signals stored in the register 4d1 coincide with the subscriber code set in the register 4d6. If the difference is two bits or greater, the subscriber code is judged not yet to have been received, and the process moves ahead to step 69, monitor the end code 209 registered in advance in the program memory 402. If the received signal is not the end code 209, the process returns to step 60 and newly goes on to wait for the next rectangular signal CD. Or, if it is the end code 209, the process jumps to step 42 to return to the battery saving state. If the difference is one bit, as with a complete coincidence, the received signal is judged to be the subscriber code, and the process moves ahead to step 71, at which the alert actuating signal ALT is issued to the oscillator circuit 13, and further to step 72 for "progress to detection of the information code".

Figure 10:
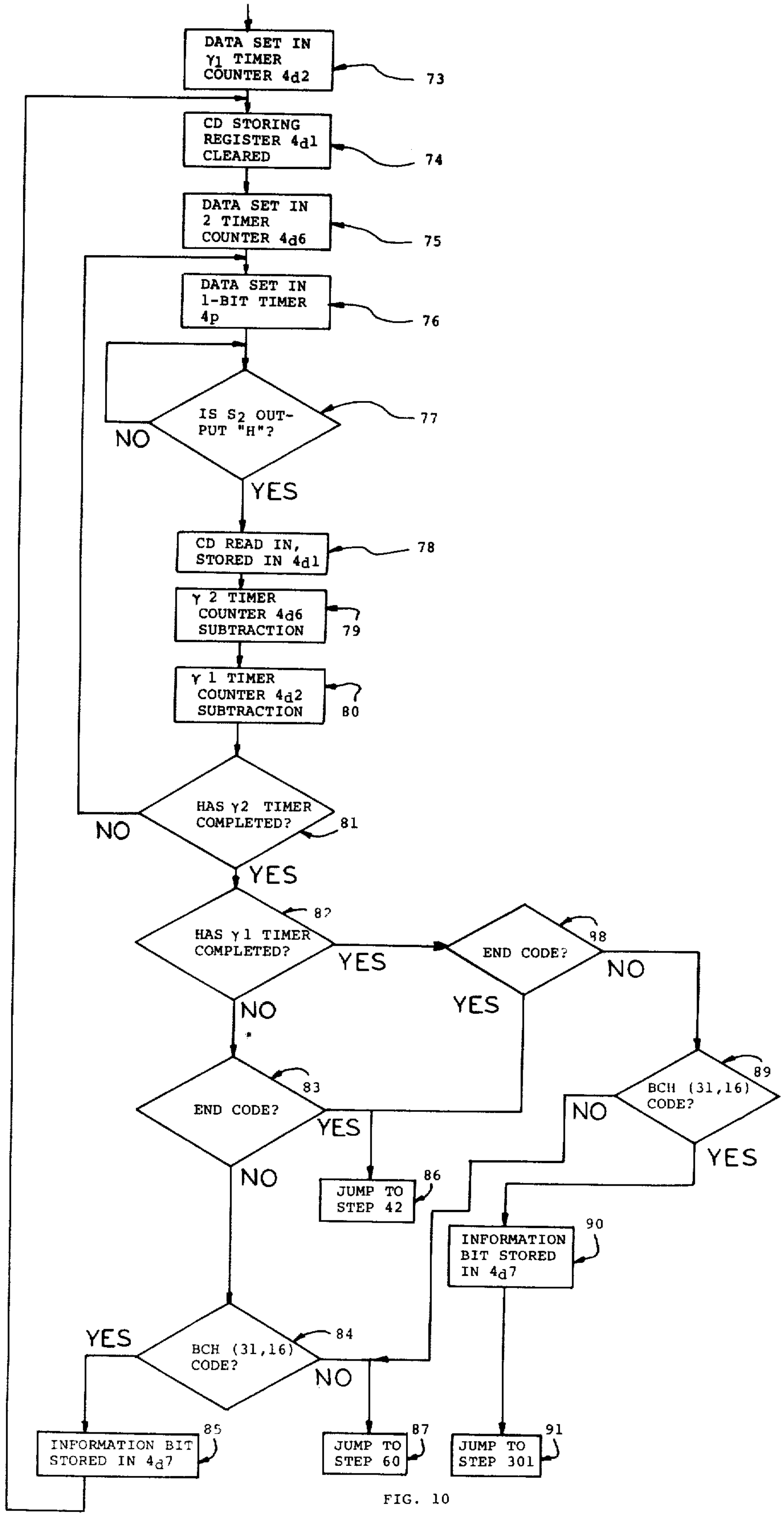
FIG. 10 is a flow chart showing an information code detecting procedure.
Figure 12:
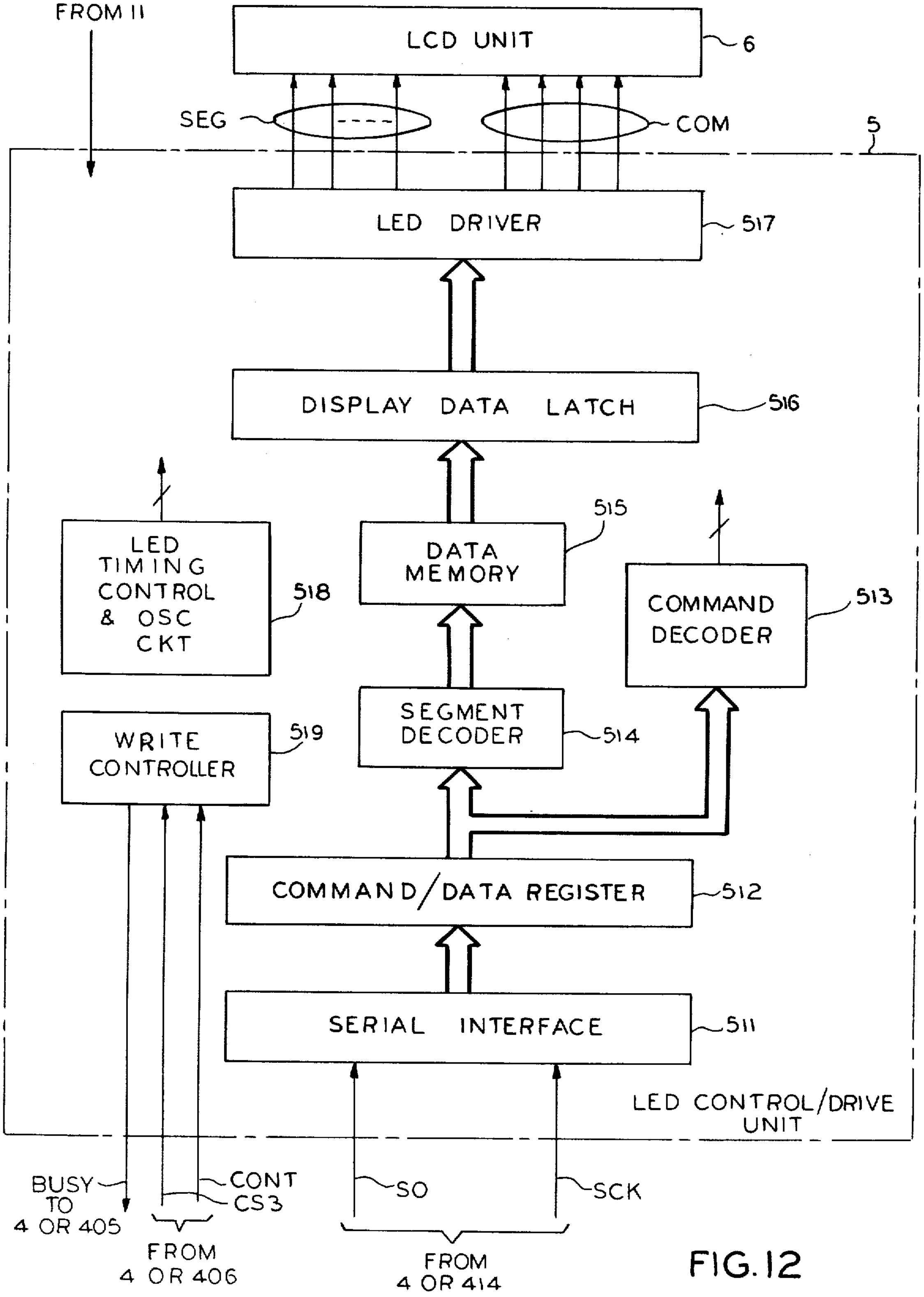
FIG. 12 illustrates the composition of a liquid crystal device (LCD) control/drive unit.

FIG. 10 is a flow chart for explaining the procedure for detection of the information code. At step 73, data for a time $\gamma_1$ corresponding to three words or $(31\times3=)$ 93 bits of the information code are set in a counter 4d2. At step 74, as at step 31, the rectangular signal storing register 4d1 is cleared. At step 75, data are stored in another counter 4d6 for a time $\gamma_2$ corresponding to 31 bits equivalent to one word. Procedures taken at steps 76 through 79 are the same as those at steps 63 through 66 described above. At step 80, one bit is subtracted from a counter 4d2. Then at step 81, a 31-bit time out is checked; if the time out is confirmed, a 93-bit time out is checked at step 82, and if this time out is not confirmed, the process moves ahead to step 83, a check. At step 83 is made to determine whether or not the 31-bit rectangular signal in the register 4d1 is the end code 209. If the end code 209 is found, the process jumps to step 42; or, if it is not the end code 209, the process moves on to step 84 to check whether or not it is a BCH (31, 16) code. If it is a BCH (31, 16) code, the information bit is stored in a register 4d7, followed by a jump to step 74. If it is not, a jump to step 60 takes place, resulting in a state of waiting for the subscriber code. Meanwhile, if the $\gamma_1$ timer takes a time out at step 82, the same procedures are followed at steps 88 and 89 as at steps 83 and 84, respectively. If, at step 89, the third word also is found a BCH (31, 16) code, its information bit is stored following those of the first and second words already stored at step 85, and the process goes ahead to step 91.

Here at steps 84 and 89 are accomplished single-error corrections, details of which will be given below. The parity check matrix given in FIG. 11 is stored in the program memory 404. Supposing the input data $I=a_1a_2a_3 \ldots a_{31}$; where "a" represents each bit of the data is either 1 or 0. These data and the parity check matrix are subjected to a matric operation. Or, the logical product of each $a_n$ and the corresponding $C_n$ is calculated, and modulo 2-added for each element:

$$S=a_1C_1 \oplus a_2C_2 \oplus \ldots a_{31}$$

The resultant matrix S is made the syndrome matrix. If this syndrome matrix S is 0, there is no error in its data. If S is not 0, it is checked with the parity check matrix C, and if $C_n=S$, the corresponding datum $a_n$ is wrong. If $a_n$ is given as 1, it is corrected to 0, and vice versa. The absence of $C_n$ corresponding to S indicates the presence of an incorrectible error in the data. Error correction is achieved in this procedure. The foregoing procedures are logical operations and therefore programmable. The principle of error correction in this manner is disclosed in Shu-lin, "An Introduction to Error Correcting Codes", 1970, Prentice-Hall Inc., among others. If, as a result of such error correction, the first bit is found to be erroneous, its content is rewritten and stored in a data memory 4d7. The foregoing has described how signal code strings are received.

Next will be explained the relationship between key code numbers and words. The key code numbers altogether consist of 12 digits, each two of which make up a word column. Thus the whole word group comprises six word columns. The relationship of correspondence between the key code number constituting each word column and words is determined in advance. Since each word column number herein consists of two digits, 100 words are assigned to each word column. For instance, key code numbers and words are determined as tabulated below for word column I represented by the first two digits, word column II represented by the second two digits, word column III, word column IV and so forth.

| Key code number | Word column I | Word column II | Word column III | Word column IV | Word column V | Word column VI |
|---|---|---|---|---|---|---|
| 00 | Telephone | in | home | on | AM | 1 |
| 01 | Go | to | office | at | PM | 2 |
| 02 | Come | on | factory | until | right | 3 |
| 03 | Contact | back | here | | | 4 |
| 04 | Stay | . | . | . | . | now |
| 05 | Wait | . | . | . | . | . |
| 06 | . | . | . | . | . | . |
| . | . | . | . | . | . | . |
| . | . | . | . | . | . | . |
| . | . | . | . | . | . | . |

When words corresponding to any of these key code numbers are written into the ROM 9, addresses in the ROM 9 are made to correspond to the foregoing table. Words corresponding to the addresses are written in. Each character is written in an 8-bit ASCII code. The final characters of word columns I through V are followed by NUL as an end symbol and the characters of word column VI are followed by an asterisk as an end symbol.

In display control/drive unit 5 (for example, μPD7225G unit marked by NEC), reference numeral 511 represents a serial interface, comprising an eight-bit serial register and a three-bit SCK counter. The serial counter takes in one bit of signals, so at the leading edge of each clock SCK fed from the serial inference 414 (See FIG. 4). At the same time the SCK counter counts up by +1 at a time.

When the counter has counted up eight, the entry of any more signal SO is prohibited, and the contents of the serial register are supplied to a command/data register 512, which latches the data transferred from the serial register. After the data are latched, the command-/data register 512, following command/data designation given by a signal CONT fed from the port 406 (See FIG. 4), supplies the latched data either to a command decoder 513 if a command is designated, or to a segment decoder 514 if data is designated. The signal CONT designates command at "High" and data at "Low".

The command decoder 513 takes in and decodes data entered from the command/data register 512, and controls the display control/drive unit 5. The segment decoder 514 is a decoder for a 14-segment type LCD, whose input data and display pattern comprise the eight-bit ASCII code. Reference numeral 515 identifies a data memory for storing display data. The μPD7225G unit at this stage has a capacity of 32×4 bits, requires a 4×4-bit address per character, and accordingly has a capacity of eight characters. Reference numeral 516 identifies a display data latch, which stores driving data for an LED driver 517, composed of 32×4 bits, having addresses in a relationship of one-to-one correspondence with the data memory 515. At the leading edge of signal $CS_3$ fed from the port 406 (See FIG. 4), the whole contents of the data memory 515 are transferred to the display data latch 516 to renew the indication of the LCD 6. Display data written into the display data latch 516 are successively selected under the control of a timing control and OSC circuit 518 and are supplied as an output after being converted into segment drive signals.

The LED driver 517, consisting of a segment driver and a common driver, generates segment drive signals and common drive signals in response to control signals from the timing control and OSC circuit 518. The common drive signals, designated for time division, successively drives the common electrodes of the LCD. In this embodiment, a four-way time division is used. The timing control and OSC circuit 518 generates and supplies to the driver 517 and LCD driving voltage. The OSC circuit also generates the system clock. The symbol SEG indicates 32 drive output signals; and COM, four common drive output signals.

Figure 13A:
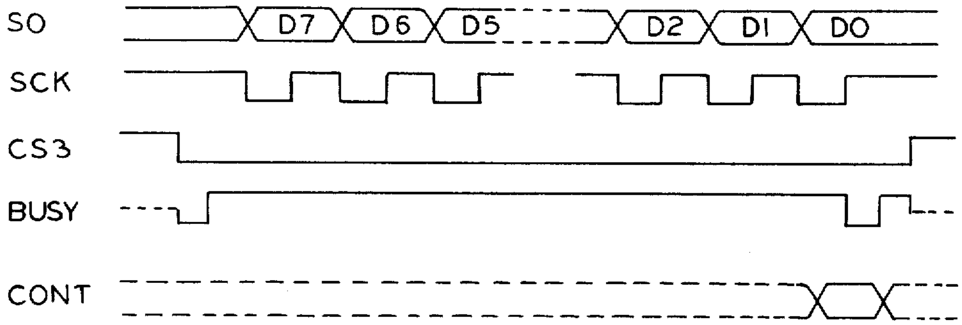
FIGS. 13A and 13B are timing charts showing data transfers of serial interface.

Hereinafter will be described in detail how serial data SO are shifted from the CPU 4 (FIG. 4) to the display control/drive unit 5 with reference to time charts of FIGS. 13A and 13B.

The serial data SO, synchronized with the serial clock SCK, are entered in eight-bit units (or one byte) at the leading points of the most significant bit (MSB). By turning $CS_3$ to a low voltage, there also is a low level for BUSY, when the BUSY signal comes up high after the completion of internal processing (clearing the SCK counter and data pointer), the transfer of the first bit (MSB) is begun in synchronization with SCK. In response to the leading edge of SCK, the serial data are transferred bit by bit to the serial register in the serial interference 511, and an entry of eight serial clock pulses results in a transfer of all the eight-bit data to the serial register. At the leading edge of the eighth serial clock, BUSY turns low to take in the condition of CONT, and the command/data designation is achieved for the eight-bit data. After that, the contents of the serial register are taken into the command/data register 512.

Figure 13B:
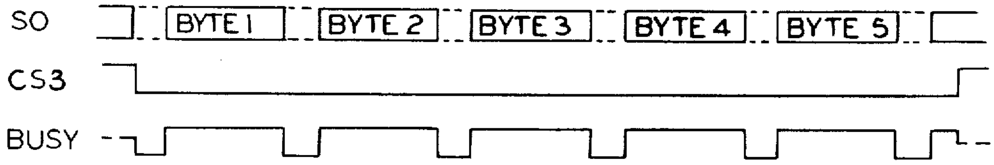

When two or more bytes of the serial data are to be consecutively entered, $CS_3$ is kept low until the entry of all the bytes is completed as shown in FIG. 13B. Upon completion of the entry of each byte BUSY turns low, and when a serial datum is taken from the serial register into the command/data register 512 BUSY turns high, so that entry of the next serial datum is made possible.

By raising $CS_3$ after the entry of all the serial data is completed, the contents of the data memory 515 are transferred to the display data latch 516.

Figure 14:
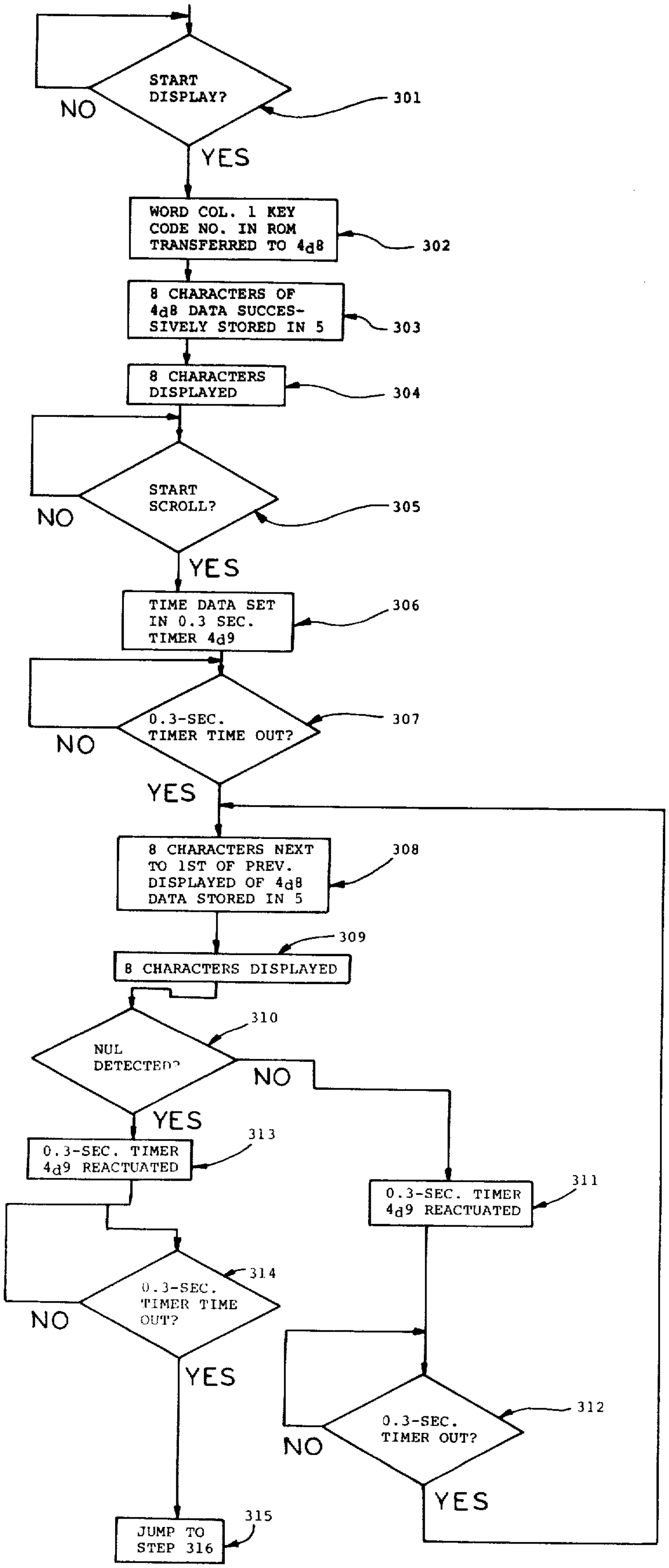
FIGS. 14, 15 and 16 are flow charts showing an LCD display operating procedure.

The display action will be described in detail hereunder with reference to the flow chart of FIG. 14. At step 301, a decision is made as to whether or not a display is started according to the state of the display start switch 15 (See FIG. 3). If the switch 15 is turned ON, the process moves ahead to step 302. At step 302, eight bits following the MSB are read out of the register 4d7 in the data memory 404, $CS_2$ is turned ON. A word (sequence of characters) corresponding to the address of the key code number of word column I in the ROM 9 (FIG. 3) and expressed in an ASCII code is read out and stored in a register 4d8. At step 303, data (for the first eight characters) stored in the register 4d8 are fed to the display control/drive unit 5, and they are displayed at step 304. At step 305, information is monitored about the turning-ON of the switch 15 to start a scroll display. If it is ON, the process goes ahead to step 306, where a time of 0.3 seconds is set in a timer 4d9, followed by monitoring of a time out at step 307. Upon time out taken in 0.3 seconds, the process moves on to step 308, at which the display control/drive unit 5 is reset, the display is turned off, and data in the register 4d8 for the first eight characters are again fed to the display control/drive unit 5 to be displayed. The first character of the previous display is cleared and each of the following characters is shifted in address by one character equivalent toward the top position. Upon detection of a NUL end symbol of word column I at step 310, the process goes ahead to steps 313 and 314. After displaying for 0.3 seconds as at steps 306 and 307, the process goes further ahead to step 316 for a jump to the key code display flow for for word group 2. If no NU1 symbol is detected, the process returns to step 308 after displaying for 0.3 seconds at steps 311 and 312.

Figure 15:
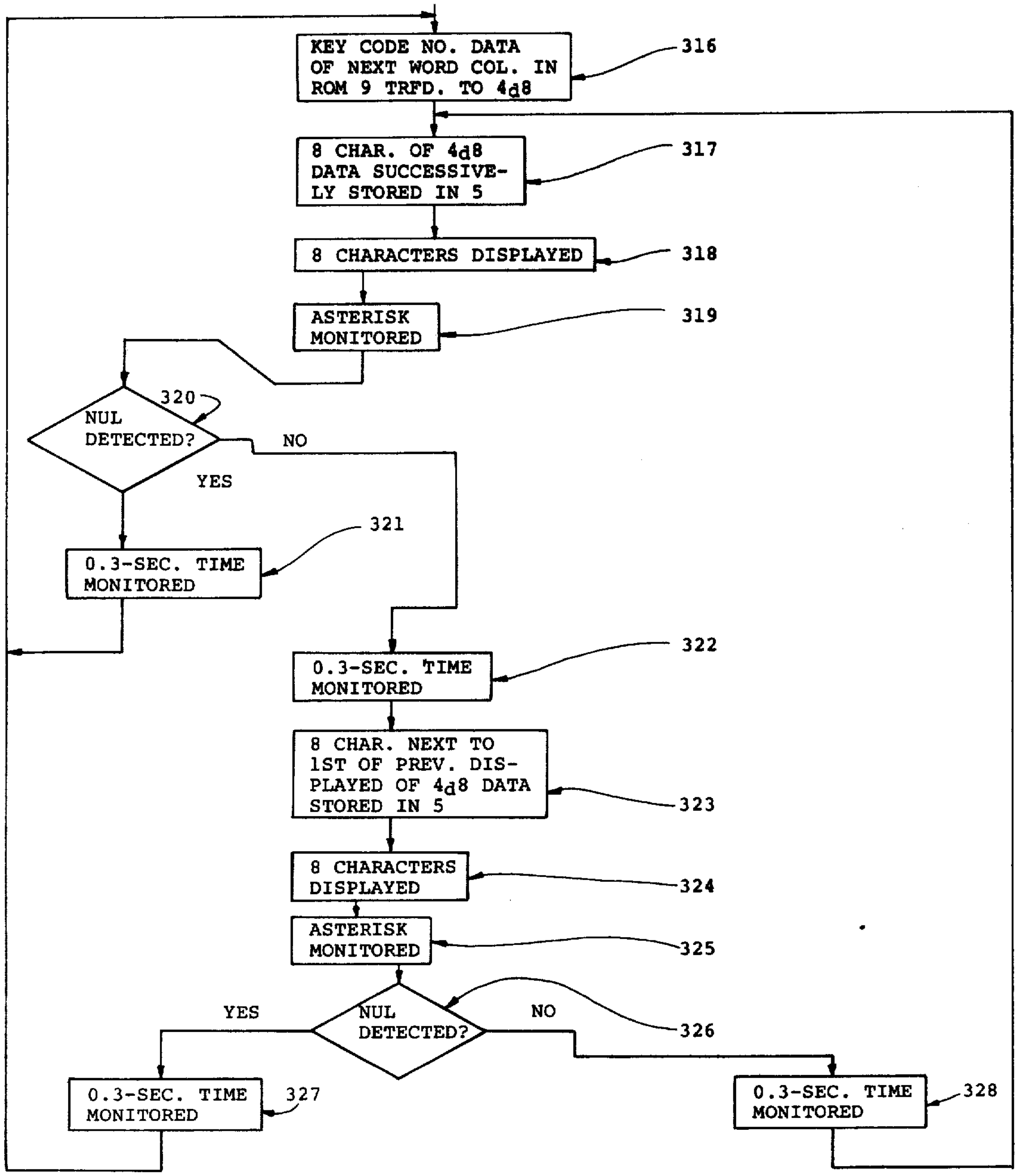

FIG. 15 is a flow chart for explaining the displaying of word groups 2 through 6. At step 316, the immediately following eight bits in the register 4d7 are read out, and a word (a sequence of characters) corresponding to the key code number of the following word group is read out of the ROM 9 and stored at the address following the previous sequence of words in the register 4d8.

At step 317, the first character in the register 4d8 is cleared, and the following characters are shifted in address by one character equivalent each toward the top position. Then the first eight characters are stored in the LED control/drive unit 5 and displayed at step 318. At 319 an asterisk is monitored, that is, the end symbol of word column VI. If no asterisk is detected, the process moves ahead to step 320 to monitor end symbol NUL of the next word column. If a NUL is detected, the process returns to step 316 after displaying for 0.3 seconds at step 321. If a NUL is not detected, the process goes ahead to step 322 and, after displaying for 0.3 seconds, moves further ahead to step 323, at which the first character in the register 4d8 is cleared and the following characters are shifted in address by one character equivalent each toward the top position. Then the first eight characters are stored in the LED control/drive unit 5, and displayed at step 325.

At 325 an asterisk is monitored, and if no asterisk is detected, the process moves on to step 326 to monitor NUL. If a NUL is detected, the process returns to step 316 after displaying for 0.3 seconds at step 327. If a NUL is not detected, the process returns to step 317 after displaying for 0.3 seconds at step 328. At these steps 321, 322, 327 and 328, the procedures as similar to the procedures at step 306 and 307.

Figure 16:
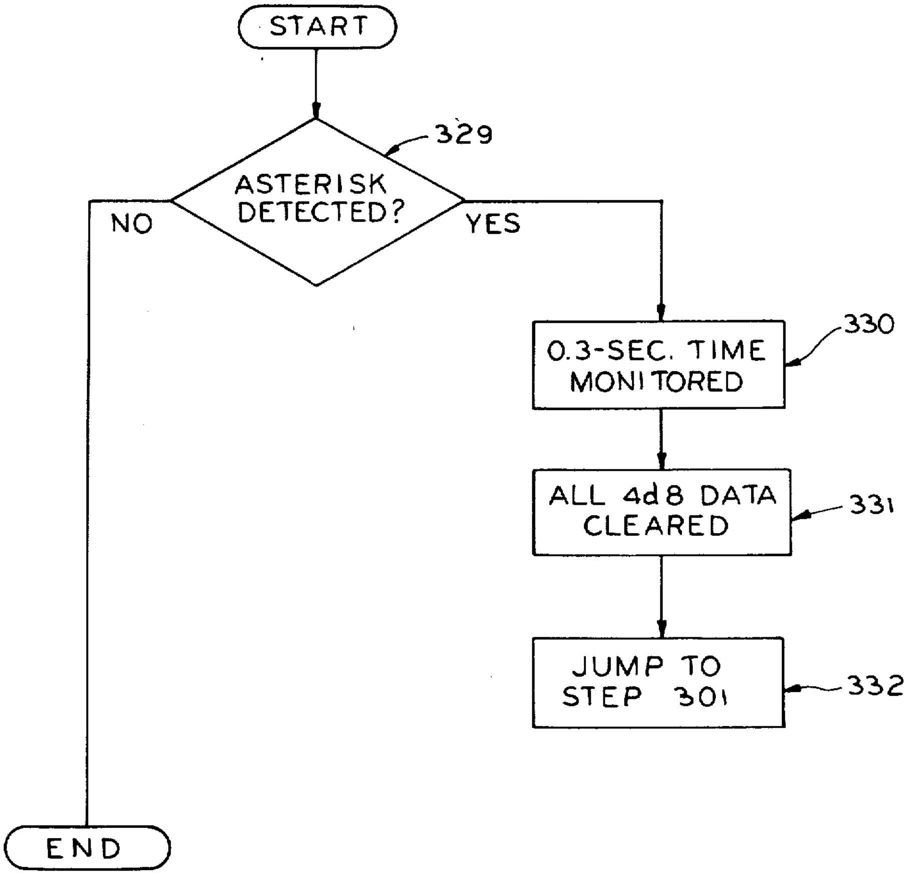

FIG. 16 is a detailed flow chart of steps 319 and 325. At step 329, an asterisk is monitored, and if no asterisk is detected, the process ends this procedure. If an asterisk is detected, eight characters are displayed for 0.3 seconds at step 330 (in similar procedures to those at steps 306 and 307), and all the data in the register 4d8 are cleared, followed by a jump to step 301.

Figure 17:
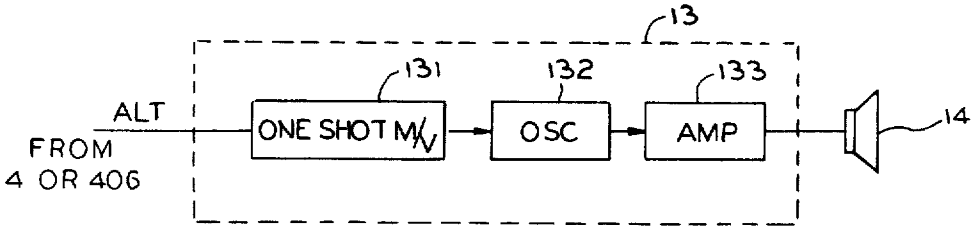
FIG. 17 illustrates a block diagram of an oscillator circuit.

FIG. 17 is a block diagram of the oscillator circuit 13. In response to an alert actuation signal ALT, a one-shot multivibrator 131 is actuated to operate for a certain period of time, and its output signal actuates an oscillator 132, whose output is amplified by an amplifier 133 to drive the speaker 14.

In the above described process, upon detection by this receiver of a key code number "020301010103" sent by said caller, an alert tone is issued for a certain period time from the speaker 14 and, because the following relations of correspondence hold,

| | |
|---|---|
| 02 → Word column I, | number 02 → COME |
| 03 → Word column II, | number 03 → BACK |
| 01 → Word column III, | number 01 → OFFICE |
| 01 → Word column IV, | number 01 → AT |
| 01 → Word column V, | number 01 → PM |
| 03 → Word column VI, | number 03 → 4 |

"COME" is indicated on the LCD display when the display switch 15 of the receiver is pushed once, another push of the display switch resulting in scroll display of "COME BACK OFFICE AT PM 4*".

Incidentally, the ROMs 8 and 9 can be integrated into a single ROM if the subscriber code storing section, key code number corresponding word (character sequence) storing section and addresses are separated from each other.

Although a word is used in the foregoing description to correspond to a key code number, a sentence can correspond to a key code number by using a blank character symbol (ASCII) for word connection.

As hitherto stated, the present invention makes a possible combination of not just characters but also words, transmission of sufficient information for routine communication, repeated confirmation of information and moreover more efficient utilization of channels than voice transmission.

What is claimed is:

1. A paging receiver comprising: first means for receiving and demodulating a carrier wave modulated with at least a paging signal code assigned to the receiver, and a plurality of information key codes corresponding to a plurality of words, respectively; second means responsive to a detection of said paging signal code for decoding said information key codes; third mean for storing in advance a plurality of words individually corresponding to said information key codes, respectively; fourth means for reading out of said third means those words which correspond to the decoded information key codes; and fifth means for displaying the read-out words in a sentence form.

2. A paging receiver claimed in claim 1, comprising sixth means for providing an alert tone when its own paging signal code is detected.

3. A paging receiver claimed in claim 1 or 2, comprising means responsive to a control signal for scrolling said read-out words.

4. A radio paging system station comprising means in said station for storing a plurality of different specific information items; means at said station responsive to the receipt of incoming signals having a calling signal and a plurality of information identifying key codes for detecting when said calling signal is assigned to said station; means in the station identified by said calling signal and responsive to the detection of said calling signal for selecting the specific information items which are stored in said station and are identified by said key codes; and means for converting said selected specific information item into a humanly recognizable communication form, said converting means comprising means for giving an individual voice message responsive to each identified stored information, and means responsive to said plurality of information key codes for assembling a plurality of said voice message into a spoken sentence.

5. The station of claim 4 and an alphanumerical display means associated with said station, said stored specific information items including signals required to read out alphanumerical signals in the form of words which may be displayed by said display means and may be read by a human who is viewing said displaying means, and means responsive to said incoming signals for scrolling a plurality of said words onto said display means in order to convey a sentence of words selected from among said stored signals.

6. The station of either one of the claims 5 or 4 and read only memory means for storing the specific information items as signals required to generate a read out in human communication terms, means for selectively addressing said read only memory at any storage location to read out a selected information item, and means responsive to said addresses for generating said human communication terms responsive to signals read out of said read only memory means.

7. The station of either one of the claims 5 or 4 and means responsive to said incoming signals for synchronizing said incoming signals.

8. The station of either one of the claims 5 or 4 and means responsive to said incoming signals for controlling the application of power to said station, said power application being either a battery saving mode of low power consumption during stand-by periods or a full power mode for powering said station to an operational level during a signal reception and a response thereto.

9. The station of claim 8 wherein said incoming signals include an alert signal for switching said power application from said standy-by battery saving mode to said full power operational level.

10. The station of claim 9 and timer means for returning said power application from said full power operational level to said battery saving stand-by mode if said station does not detect its address in the incoming code.

* * * * *